United States Patent [19]

Miquel

[11] 4,159,707
[45] Jul. 3, 1979

[54] SOLAR ENERGY COLLECTOR AND INSTALLATION EMPLOYING SAME

[75] Inventor: Jean-Francois Miquel, L'Hay-les-Roses, France

[73] Assignee: Agence Nationale de Valorisation de la Recherche, Neuilly, France

[21] Appl. No.: 800,527

[22] Filed: May 25, 1977

[30] Foreign Application Priority Data

May 26, 1976 [FR] France ............................ 76 16055

[51] Int. Cl.² .................................................. F24J 3/02
[52] U.S. Cl. ..................................... 126/270; 126/271; 427/160
[58] Field of Search ............... 126/270, 271; 237/1 A; 427/160

[56] References Cited

U.S. PATENT DOCUMENTS

| | | | |
|---|---|---|---|
| 2,288,465 | 6/1942 | Knudsen | 126/270 |
| 3,971,359 | 7/1976 | Bourne | 126/270 |
| 4,002,159 | 1/1977 | Angilletta | 126/270 |
| 4,011,190 | 3/1977 | Telkes | 427/160 |
| 4,034,736 | 7/1977 | Telkes | 126/270 |
| 4,043,317 | 8/1977 | Scharfman | 126/270 |
| 4,050,443 | 9/1977 | Peck et al. | 126/270 |
| 4,061,830 | 12/1977 | Greenberg | 427/160 |
| 4,087,288 | 5/1978 | Reid | 427/160 |
| 4,105,822 | 8/1978 | De Jong | 427/160 |

Primary Examiner—John J. Camby
Assistant Examiner—Larry I. Schwartz

[57] ABSTRACT

The invention relates to a solar energy collector of the type comprising a pick-up receiving the solar radiation and converting at least a part of this radiation into heat, and heat-exchange means bringing a heat-exchange fluid into thermal contact with the pick-up and evacuating this fluid towards a user station, said pick-up comprising an assembly of juxtaposed plates which are substantially parallel to one another and form a layer, wherein the distance between two adjacent plates is chosen so as to constitute a well of heat in which the solar radiation is subjected to at least two reflections, at least one of the opposite faces of this well of heat is selectively absorbent for the infrared part of the solar radiation, the two faces of this well are substantially reflecting for the rest of the solar spectrum, and the layer of plates is disposed between a front transparent wall receiving the solar radiation and a rear wall, these walls being substantially parallel to said layer and defining therebetween an enclosure in which a heat-exchange fluid circulates. The invention also concerns an installation employing this collector.

17 Claims, 12 Drawing Figures

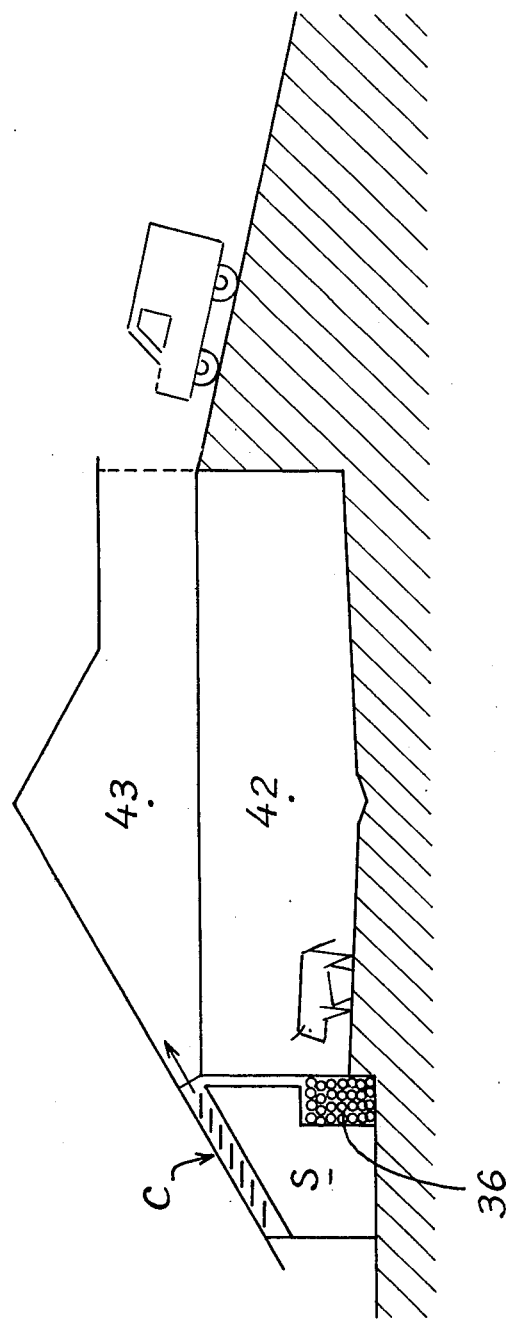

SOLAR ENERGY COLLECTOR AND INSTALLATION EMPLOYING SAME

The present invention relates to a solar energy collector, of the type comprising a pick-up receiving the solar radiation and converting at least a part of this radiation into heat and heat exchanger means bringing a heat-exchanging fluid into thermal contact with the pick-up and evacuating this fluid towards a user station.

At present, one of the essential limitations of the heating of a dwelling by solar energy comes from the considerable surface which must be provided for the flat collectors. This limitation considerably encumbers the economic evaluation of the operation by the capital investments necessary and creates a handicap for the architect who has to place on the south/south-east to south/south-west faces of the dwelling, blind surfaces which are often dark or black in colour, this considerably limiting the architectural effect and rendering the majority of present realisations unaesthetic.

The present invention remedies this drawback and has for its object to provide a solar energy collector of low cost price, which may be harmoniously integrated in the architecture of a dwelling.

This purpose is attained according to the invention in that the pick-up comprises an assembly of juxtaposed plates parallel to one another and forming a layer, the distance between two adjacent plates being selected so as to constitute a well of heat in which the solar radiation undergoes at least two reflections, at least one of the opposite faces of this well being absorbent for the infrared part of the solar radiation.

The layer of plates is advantageously disposed between a transparent front wall and a rear wall, these walls being substantially parallel to said layer.

The plates may advantageously swivel about a longitudinal axis.

A second pick-up is advantageously disposed between the rear wall and the first pick-up.

The front and rear walls advantageously define an enclosure in which a heat-exchange fluid circulates.

The rear wall is advantageously selectively transparent for the visible and the ultra-violet.

The plates are advantageously made by being stamped out of sheet metal.

A semi-reflecting surface is advantageously located behind the first glazing responsible for the glass-house effect, which surface prevents the infrared radiation produced by the blackbody from leaving the closed enclosure.

In accordance with the invention, the wells of heat constituted by the mobile, parallel plates, act as blackbody.

The rear wall of this solar collector may be transparent and comprises a semi-reflecting internal face which also traps the infrared radiation whilst allowing the shorter wave lengths of the solar radiation to pass through.

According to another embodiment, this rear wall may be totally opaque and constitute a reflecting surface producing, behind it, an effective heat insulation.

According to a particular feature of the invention, wells of heat also forming "blackbody" obtained from a juxtaposition of pivotal plates of dark, mat colour, for example made of anodised aluminium, are constituted between two opposite, parallel faces of these plates, which wells, whilst allowing a certain proportion of light to penetrate according to the inclination of these parallel plates, trap the infrared radiation between the parallel plates and thus take the pivotal plates to a certain heat.

These plates are advantageously covered with specific coatings selectively absorbing the infrared radiation.

At least certain plates advantageously carry photovoltaic cells.

An upward stream of air maintained by pressure or depression is created in the enclosure of the collector.

This stream of air circulates from the front face of the collector towards its rear face thus passing between the parallel plates and recovering the energy which is fixed on these plates.

This window-collector according to the invention functions at a relatively low temperature, this improving its yield, this result being obtained by a judicious relationship between the air input temperature and the output temperatures, the quantity of energy received by the pick-up (insolation), the inclination of the plates as a function of the need for light inside the room.

Such a system may easily be automated so as to conserve at the output a temperature close to that required by the heat engine placed at the end of the collector pipes and which will convert the energetically low-value calories thus produced into calories which may be used for heating, refrigeration or the production of a mechanical operation.

One of the advantages of this invention resides in the noteworthy insulation thus obtained in curtain-walls which architects regularly use. These curtain-walls at present have the drawback of making the building expensive to heat or cool due to a limited insulation and to the "a contrario" amount of solar energy, low in winter and high in summer.

At present, systems of semi-reflecting panes tend to reject the maximum of energy-rich radiation towards the outside. According to the principle of the invention, this energy may be recovered in winter and especially contribute valuable calories in summer for cooling buildings.

In this way, the various collectors according to the invention may be placed equally well in front of the windows or blind walls of a building, so that it is possible to use all the surface area of the sunny facades of the building for picking up the solar energy.

Moreover, these collectors may be flat, of small thickness and may function with a good yield, oriented vertically. They may therefore be integrated in a facade without affecting the aesthetic appearance thereof, and even contribute to the aesthetics, particularly due to the scale-like structure of the pick-up and to the vertically extended form which it is possible to give the collectors to allow the establishment, in said latter, of a circulation of heat-exchange fluid by natural convection.

The invention will be more readily understood on reading the following description with reference to the accompanying drawings, in which.

Figure 9:
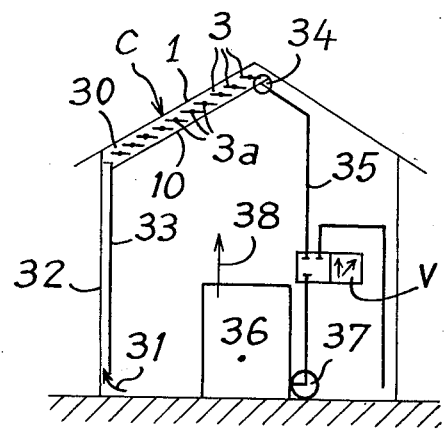
Figure 10:
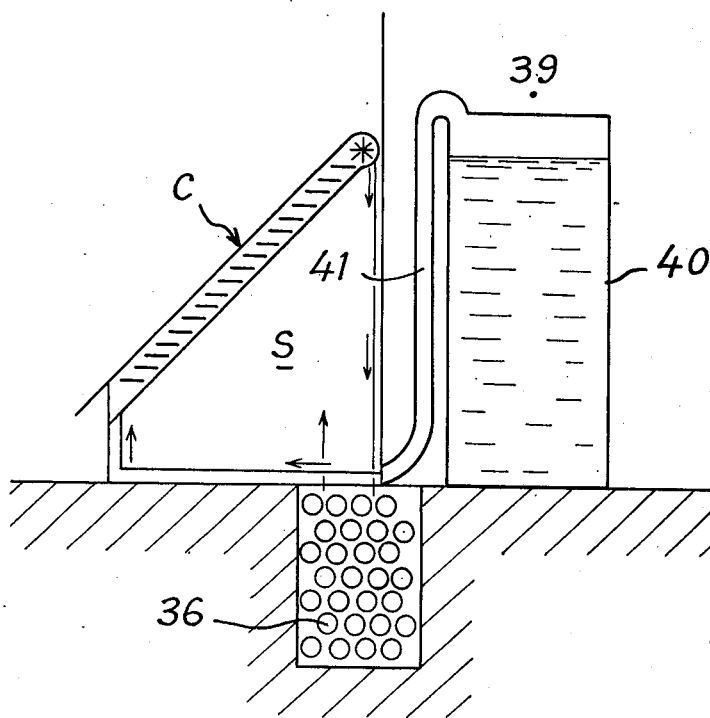

FIG. 9 schematically shows in vertical section a glasshouse equipped with an installation using heat of solar origin according to a first embodiment of the invention;

FIG. 10 schematically shows in vertical section a glasshouse equipped with an installation according to a second embodiment of the invention; and FIG. 11 schematically shows in vertical section a glasshouse equipped with an installation according to a third embodiment of the invention.

Referring now to the drawings, FIGS. 1 to 4 show so-called blind collectors opaque to solar light whilst FIGS. 5, 6, 8 and 9 show collectors allowing the visible and ultraviolet to pass and retaining only the infrared part of the solar light.

Figure 1:
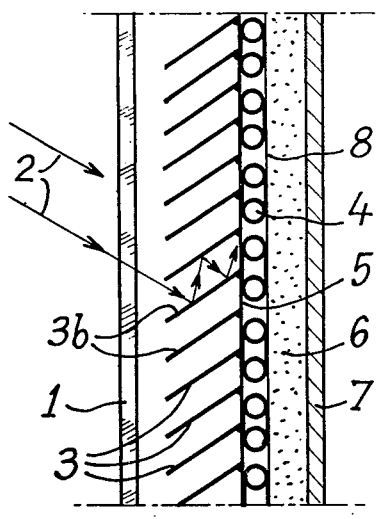
FIG. 1 is a vertical section through a collector according to a first embodiment of the invention.
Figure 2:
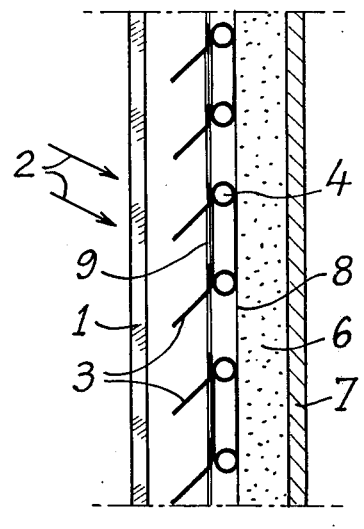
FIG. 2 is a vertical section through a collector according to a second embodiment of the invention.

These different collectors comprise a front wall 1 made of glass of polymer receiving the solar rays 2 and of which the coefficient of light transmission must be as high as possible for the whole of the solar spectrum, a pick-up disposed behind the front wall and intended to convert at least a part of the solar radiation into heat, and a rear wall parallel to the front wall 1 and defining with said latter an enclosure which, in the case of FIGS. 1 and 2, is filled with a stable fluid such as air.

Figure 4:
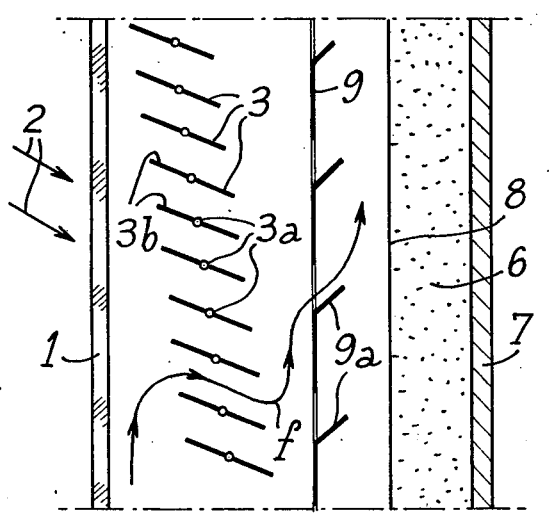
FIG. 4 is a vertical section through a collector according to a fourth embodiment of the invention.
Figure 5:
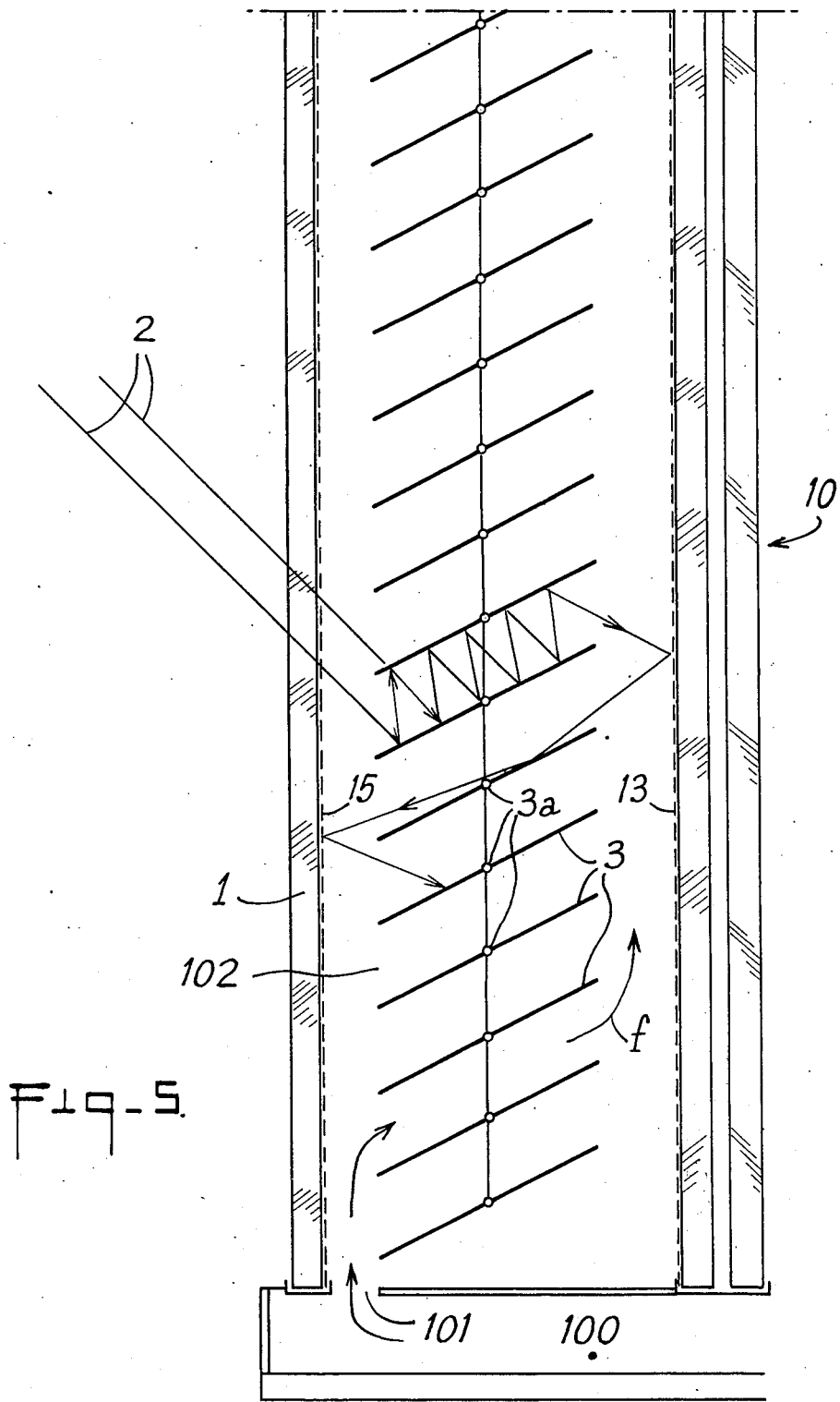
FIG. 5 is a vertical section through a collector according to a fifth embodiment of the invention.
Figure 6:
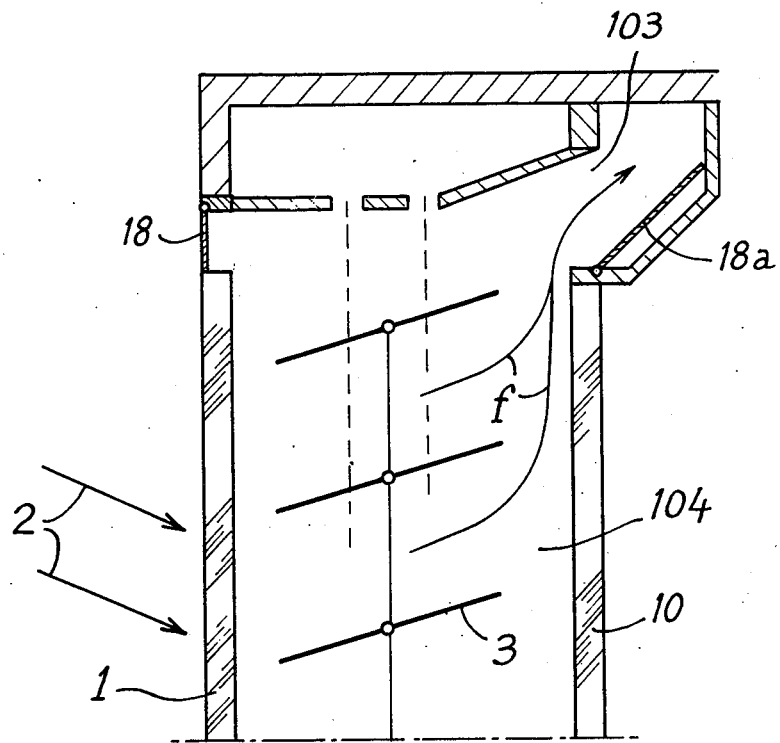
FIG. 6 is a vertical section through a collector according to a sixth embodiment of the invention.
Figure 6:
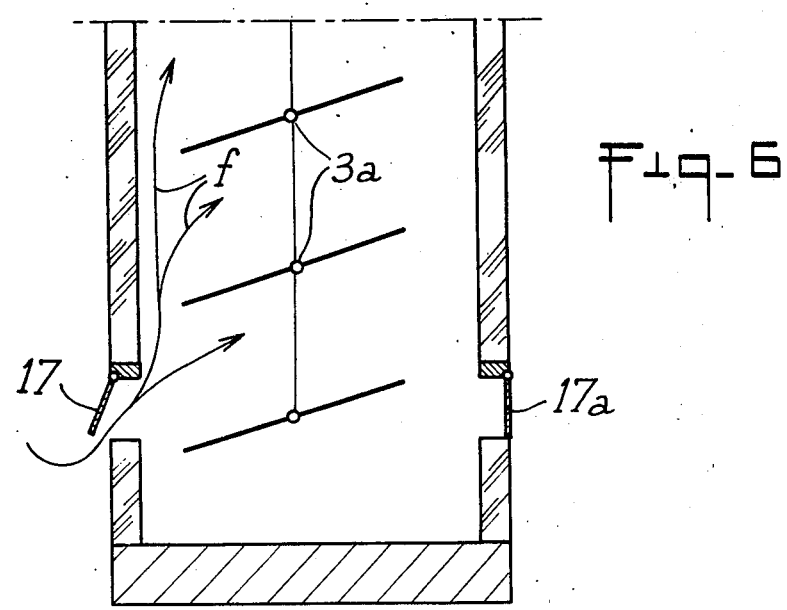

The pick-up comprises at least one series of flat elements or plates 3 which are juxtaposed and extend in a direction perpendicular to the plane of the Figures, and oriented parallel to one another, so that these plates form a flat layer substantially parallel to the front and rear walls, the space between the pick-up and the front wall preferably being of width shorter than that of the plates 3. The plates 3 are either fixed (FIGS. 1 to 3) or free to turn about their median longitudinal axis 3a (FIGS. 4 to 6).

The collectors shown also comprise a heat exchanger whose heat-exchange fluid is intended to take the calories of the or each pick-up and to take them to a user device such as a heat engine or to a calorie storage device such as a hot water tank.

In the case of FIGS. 1 and 2, the heat exchange is constituted by a coil 4 wherein circulates a heat-exchange liquid such as water; this coil is made of metal and it is welded to the rear face of the pick-up, so as to promote to the maximum the heat exchanges between the pick-up and the water circulating in the coil.

According to a variant embodiment, the coil 4 may be replaced by a flat metallic enclosure in which the heat-exchange liquid circulates.

In the case of FIGS. 1 and 2, the plates 3 are inclined downwardly and towards the front wall 1, in order to prevent the movements of natural convention of the stable air directed from the rear wall towards the front wall. This results in an improvement in the heat insulation of the pick-up with respect to the front face.

In the case of FIGS. 3 to 6, the evacuation of the calories furnished by the pick-up is obtained by a circulation of gaseous fluid, more generally air, or even liquid in the case of the blind collectors, through the pick-up in the chamber or enclosure defined by the front and rear walls of the collector. This circulation takes place from bottom to top in the direction of arrows f, by natural convention (by thermosiphon) or by forced circulation.

Figure 3:
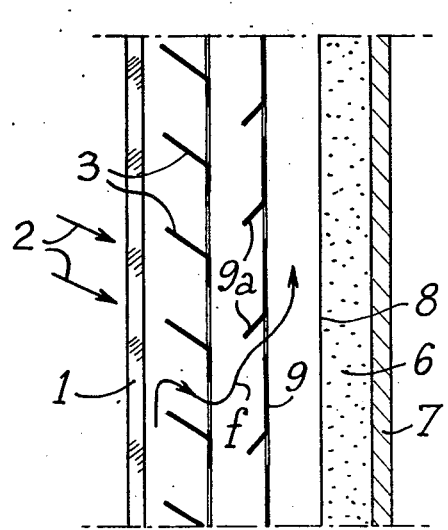
FIG. 3 is a vertical section through a collector according to a third embodiment of the invention.

The plates 3 may be welded edgewise on a base sheet 5 (case of FIG. 1); they may be stamped from sheet metal (case of FIGS. 2 and 3). They may be independent and mounted to rotate about their axis 3a between two lateral cheeks; a device enables all of them to be pivoted at the same time by any angle, whilst maintaining them parallel to one another (case of FIGS. 4 to 6). This device may be of the type such as used in so-called venetian blinds.

The plates 3 each present at least one face absorbing the infrared radiation of the sun and converting it into heat; this absorbant face is the one (3b) which directly receives the solar rays 2. The plates 3 may be made of anodised aluminum or coated with a dark or black paint absorbing the solar radiation, or of glass, metal or plastic with selective absorption as a function of the wave length of the solar radiation. In particular, the plates may be made of metal and have surface layers of oxide, crystalline growths or the like improving the thermal yield of the conversion of the solar photons, particularly infrared phontons, into heat.

In the case of blind collectors (FIGS. 1 to 4), the rear wall is opaque and comprises a heat insulator 6 applied to a rigid wall 7; a sheet 8 of reflecting aluminium covers the face of the insulator 6 facing the pick-up. The purpose of said aluminium sheet 8 is to return to the pick-up the solar radiation that it receives.

In the case of the blind collectors using a circulation of fluid to remove the calories furnished by the pick-up (case of FIGS. 3 and 4), the thermal yield of the collector is improved by disposing a second pick-up 9 between the first pick-up and the rear wall. The rear pick-up 9 also comprises a series of parallel plates 9a extending in the direction perpendicular to the plane of the Figures; the plates 9a are oriented downwardly or upwardly according to the diagram of FIGS. 3 and 4, according to whether the plates 3a are oriented upwardly or downwardly. The face turned towards the front pick-up of the pick-up 9, and particularly of plates 9a, is designed so as to be able to absorb the solar radiation and convert it into heat. This second pick-up 9 has a flux of fluid passing therethrough at a higher temperature than that passing through the first pick-up; by this process, the heat losses through the front wall 1 are reduced.

The plates 3 are juxtaposed, or superposed, so as to constitute a generally flat assembly in which said plates 3 may either be of vertical or horizontal axes. In the case of FIG. 4, the plates 3 of the front pick-up are of horizontal axes and form a flat assembly which is slightly inclined with respect to the vertical, approaching the front wall 1 from bottom to top; this arrangement promotes the flow of fluid through the pick-up whilst promoting the tendency of the fluid to rise along the front wall 1 due to the difference in temperature between the top (hot) and the bottom (cold) of the collector.

According to the embodiments shown in FIGS. 5 and 6, the rear wall of the collector is a wall 10 which is selectively transparent for the visible and ultraviolet part of the solar radiation. According to FIG. 5, the rear wall is double in order to obtain a good heat insulation between the interior and exterior of the collector on the rear side. In this way, a window-collector is obtained which may act as bay window.

Figure 7A:
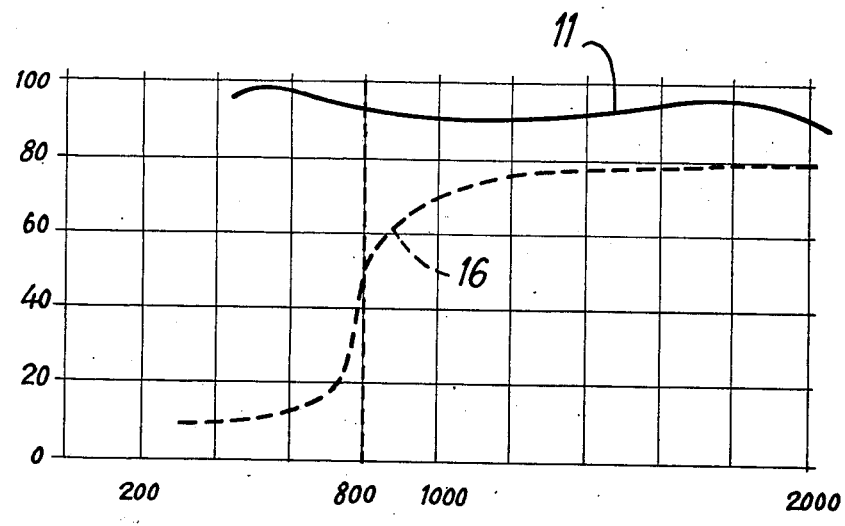
FIG. 7a is a diagram of the coefficient of transmission of the front wall and of the coefficient of reflexion of a semi-reflecting layer of this wall as a function of the wave-length of the radiation.
Figure 7B:
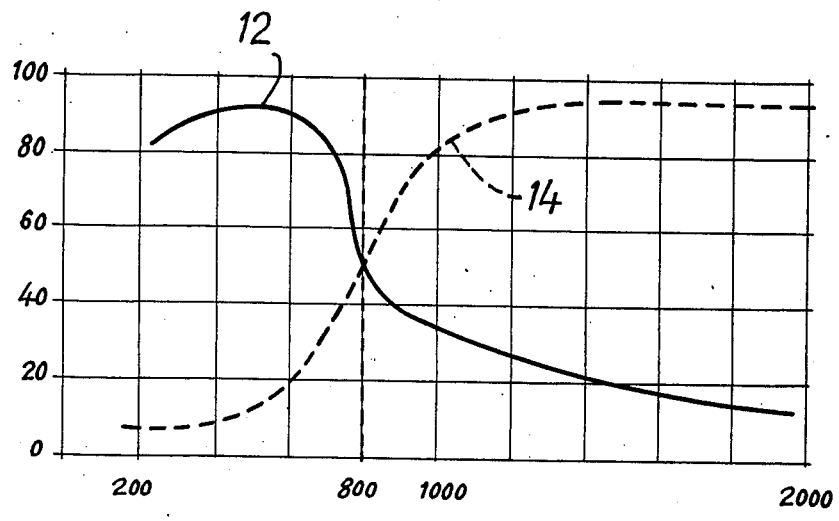
FIG. 7b is a diagram of the coefficient of transmission of the rear wall and of the coefficient of reflexion of a semi-reflecting layer of this wall as a function of the wave-length of the radiation.

To obtain a satisfactory functioning of the collector according to FIGS. 5 and 6, it is preferable to use a front wall whose coefficient of transmission of the solar radiation is high for the whole of the solar spectrum, for example in accordance with the curve 11 of FIG. 7a, and a rear wall whose coefficient of transmission of the radiation which it receives is high only for the visible and infrared part of the solar spectrum of the wave length in accordance with the curve 12 of FIG. 7b.

To this end, the rear wall may be provided on its internal face with a semi-reflecting layer 13 having the property of selectively reflecting the infrared part of the radiation which it receives and of transmitting the visible and ultraviolet part of this radiation.

The variation of the coefficient of reflexion of this semi-reflecting layer 13 as a function of the wave-length of the solar radiation is advantageously substantially in accordance with the broken-line curve 14 of FIG. 7b. The front wall 1 is also advantageously provided on its internal face with a semi-reflecting layer 15 whose role is to return to the pick-up the infrared part of the radiation which it receives whilst allowing all the solar spectrum to pass. The variation of the coefficient of reflection of this semi-reflecting layer 15 as a function of the wave-length is substantially that shown by the curve 16 of FIG. 7a.

In practice, the rear wall 10 must transmit, with a high coefficient of transmission, only the solar radiation whose wave-length is lower than a value included between 800 and 1200 nm. The semi-reflecting layers 13 and 15 forming part of the rear and front walls must reflect, with a high coefficient of reflection, only the solar radiation whose wave length is higher than a value of between 800 and 1200 nm.

The solar radiation 2 passes through the front wall 1 made of glass or polymer, the transmission of which is as high as possible on the whole of the solar spectrum.

The solar flux having penetrated into the chamber constituted by the two transparent walls 1 and 10 is then subjected to a series of absorption-reflection in the "wells of heat" constituted by the pivotal plates 3 whose surfaces are specifically reflecting for the wave-lengths of the visible part of the solar spectrum ($\lambda <$ 800 nm); these same surfaces being specifically absorbant for the wave-lengths which constitute the infrared part ($\lambda >$ 800 nm) of the spectrum.

According to the hour of the day, place, season, outside temperature, etc., it is possible to orientate the plates with respect to the solar flux to obtain the optimum ratio between the luminosity desired inside the building and the energy picked up on the plates. The various factors involved in the determination of this optimum are measurable and the whole therefore lends itself to an automatic control (if this is desired) of the angle of the plates with respect to the direction of the solar flux.

The energy is absorbed on the plates according to the principle of the blackbody. These plates therefore radiate hemispherically with respect to their plane in the distant infrared. This infrared radiation is partly reabsorbed by an adjacent parallel plate, another part of this radiation by direct emission or by reflection may reach one or the other of the transparent walls which define the chamber.

As shown in FIG. 5, the air to be heated arrives through a sheath 100 into the chamber through an opening 101 at the lower end of the space 102 between the layer of plates 3 and the front wall 1. The plates 3 which are inclined downwardly from rear to front, promote the flow of the air between the plates 3. As shown in FIG. 6, the heated air is evacuated from the collector through an opening 103 in the chamber, at the top end of the space between the layer of plates 3 and the rear wall 10.

According to the embodiment shown in FIG. 6, the collector comprises on its front wall 1 and rear wall 10 a flap 17, 17a opening at the base and a flap 18, 18a opening at the top of these walls 1, 10.

The collector of FIG. 6 may be used as follows:

The plates 3 being inclined downwardly from rear to front, the rear-bottom flap 17 is open; the air of the room is thus extracted and led to the front of the collector by the depression created when the sun strikes the pick-up; this air rises along the front pane, passes between the plates 3 and is directed, reheated, towards the rear of the collector where it is extracted at the top-rear by flap 18a whose dimensions are greater than those of the bottom-rear flap 17a.

When the house is inhabited, the bottom-front flap 17 may also be opened to renew the air in the dwelling.

During the summer, the plates 3 are most often inclined, during the day, upwardly from rear to front, the top-rear flap 18a remains closed. The top-front flap 18 is then open. In this way, the air may either be made to circulate inside the collector by opening the bottom-front flap 17;

or a stream of air may be created in the dwelling by closing the flap 17 and opening the bottom-rear flap 17a.

In this way, the juxtaposed plates 3 of the pick-up according to the invention constitute "wells of heat" in each of which the incident solar radiation 2 undergoes at least two reflections. These plates 3 may act simultaneously as "well of heat" and blackbody. When they are provided to be pivotal (case of FIGS. 4 to 6), they may be maintained perpendicular to the solar rays 2.

The plates 3 located at the lower end of the collector may, particularly in the low parts of the pick-up, carry on their face turned towards the sun, photovoltaic cells since their temperature remains low.

According to the example of FIG. 4, the plates 3 act as wells of heat as well as blackbody. This collector presents, with respect to those of FIGS. 1 to 3, the supplementary advantage of being able to pivot the plates 3 according to the time of day or year, to lift them if necessary to eliminate absorption, leaving the reflecting aluminium sheet 8 opposite the front wall 1 (glass or plastic) which defines the outside of the collector.

According to a particular feature of the invention, the plates 3 are constituted by a metal absorbing the solar infrared on the two faces (dark paint on anodised metal or aluminium) or absorbing this infrared on one face and reflecting the infrared on the other face according to the desired effect (optimum thermal yield or aesthetic effect of the facades).

In this example of FIG. 4, as in the example of FIG. 3, the collectors may comprise on the front face a flap opening at the base and a flap opening at the top of wall 1; in conjuction with open or closed parts of the top and of the base of the rear wall, these flaps of the front wall enable the air inputs to be modulated according to need.

Figure 8:
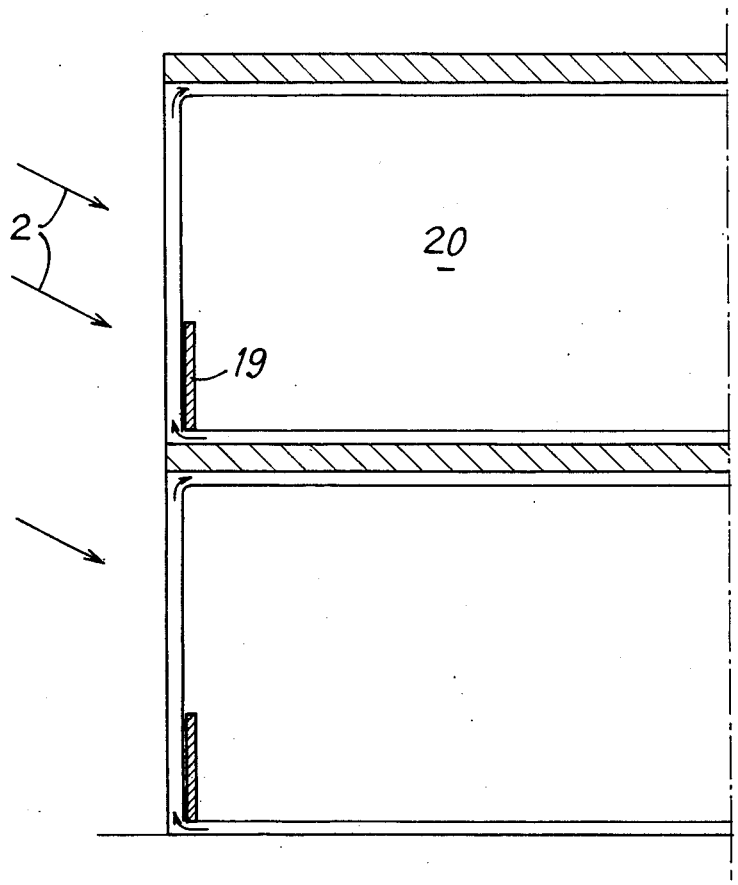
FIG. 8 is a vertical section through a building provided with collectors according to the invention.

The pick-up formed by the assembly of the plates 3 may be placed equally well in front of blind walls or in front of windows of a building. It is thus possible to use the whole of a sunny facade of a building. FIG. 8 shows how the collectors according to the invention can be harmoniously integrated in a building designed according to modern architecture with large facade surfaces reserved for bay windows. According to FIG. 8, a single collector is disposed from the floor to ceiling of a storey of a building. The part of the collector covering a breastwall 19 is blind and may comprise plates 3 absorbing the whole of the solar spectrum or may be provided, like the rest of the collector with plates with faces selectively absorbing the infrared and reflecting the visible part and ultraviolet and may further comprise a second pick-up located behind the first and constituting a blackbody for the whole of the solar spectrum.

It should be noted that the cold air, drawn at the base of the collector, does not immediately collect the calories of the pick-up; it rises along the front wall 1 and progressively recovers these calories on passing through the layer of parallel plates. This cold air constitutes a heat insulator preventing the calories from escaping from the pick-up towards the front wall. This results in the front wall having no need to be insulating from the point of view of heat and may be constituted by a simple sheet of glass or transparent plastic, this reducing the weight of the collector and its cost price. This is applicable to blind collectors and window collectors.

It should also be noted that the collectors according to the invention are flat and function whilst they are vertical, this enabling them to be integrated in facades of buildings. These collectors also function, moreover, when oriented obliquely as the plates 3 may be maintained perpendicular to the solar flux.

Moreover, these collectors may contribute to the aesthetic appearance of a building, particularly due to the scale-like structure of the pick-ups and to the vertically extended form which it is desired to give the collectors to allow a circulation of heat exchange fluid by natural convection to be established in said collectors.

Glass-houses constitute an important application of the present invention. It is advantageous to separate heating from lighting of glass-houses. In summer, the ultraviolet and visible radiation is indispensable whilst protection is desired from too high a temperature. The south faces may then be equipped with window collectors.

The calories produced may be extracted by a gas in a closed primary circuit.

This gas may be used directly in a heat engine to effect a mechanical operation, heat or cool another fluid.

This gas must also be non-corrosive, non-toxic or explosive and must be of low cost as a function of the risks of leakage.

Finally, it must be particularly absorbent in the infrared and possess a considerable specific heat at the temperatures of use.

The south face of the glass-house, shown in FIG. 9, is constituted by two parallel walls 1 and 10 made of a transparent material (glass or macro-molecular material); these two walls being parallel, they leave a space 30 therebetween in which a gaseous fluid (air, air + $CO_2$) may circulate.

In the space 30 included between the two parallel walls 1,10, is located a pick-up adapted to receive the solar radiation and convert it into heat.

This pick-up is constituted by a layer or network of parallel plates 3 which may be made with metals: aluminium, copper, iron, etc. or with a glass absorbing the infrared radiation. According to the case, this material constituting the plates 3 may be coated on the two faces with a coating selectively absorbing the low energy infrared radiation. It may also be coated with this selectively absorbent layer on one face, the other face being coated with a selective reflecting paint for selected wave-lengths, particularly for the infrared.

The plates 3 may all pivot as desired by the same angle about their longitudinal median axis 3a by means of a device (not shown).

Several embodiments of the installation using energy of solar origin according to the invention will be given hereinafter.

EXAMPLE 1

In a first example shown in FIG. 9, a glass-house of conventional construction is equipped, on its south face, along the east-west axis, with collectors C of the type described hereinabove. The air in the glass house is taken at 31 at the bottom of the vertical wall 32 through a vertical pipe 33 terminating in the collector C at the lower end of said latter, and it is extracted from the collector C at the ridge of the glass house through a pipe 34 which runs along the east-west axis.

This pipe 34 bears extraction terminals at each panel, separated from one another by the metal supports which exist in the metallic construction of the glass houses.

During a summer's day, the air rising between the two parallel transparent walls 1, 10 of the collector C recovers the calories from the solar flux which have been trapped by the network of parallel plates 3 of said collector. This air is therefore reheated and it is extracted from the collector at the ridge of the glass house then conducted through a descending vertical pipe 35 into a storage unit 36 constituted, according to a preferred embodiment, by a bed of river gravel or pebbles placed on a metal grid. A fan 37 drives air into the whole of the circuit.

By heat exchange, the air gives the gravel of device 36 the calories which it carries, with a good yield since, contrary to the storage systems employing liquid, there is no mixture between the layers of gravel and the air passes through a heat gradient in which it encounters less and less hot zones. The air leaving the device 36 is blown at 38 into the glass house.

In this way, the storage unit 36 constitutes a buffer device due to which it is possible to regulate the thermal mass collected, which, in the absence of this device, will accumulate inside the glass house and make it necessary to provide a system for evacuating the calories by natural or forced ventilation; this results in a saving which partly compensates the cost of the installation of collectors C.

In this way, in the construction of the glass house, it is not necessary to provide particular systems of aeration on the one hand nor a system of ventilation for hot periods on the other hand; moreover, the cost of irrigation water necessary for the plants in the glass house is reduced since the temperature inside the glass house may thus be controlled. The savings thus made also assist the installation of the collectors C to pay for itself.

During the night, the glass house radiates skywards. This loss of calories by radiation, particularly substantial when the night is clear, is limited by pivoting the parallel plates 3 so as to present towards the sky the face of said plates having a minimum power of radiation.

Furthermore, the calories stored in the device 36 may then be used to reheat the atmosphere of the glass house. The valve V is switched to turn off the collector C.

The fan 37 then blows the air of the glass house through the bed of gravel of the device 36, extracts the calories therefrom which are thus added inside the glass house and contributes a saving in outside heating which would have been necessary.

This system does not claim to balance the total thermal balance of a glass house in all climates. However, in temperate zones and zones of contrast: hot during the day, cold during the night, its economic value is such that the installation rapidly pays for itself.

However, it has been noted that the economic system which is very satisfactory in climatic zones with a considerable difference in daytime and nighttime, also proves profitable in the majority of temperate climates as demonstrated by the yields of the collectors and the studies of insolation which have been conducted in northern climates.

EXAMPLE 2

In the preceding example, the air used is picked up at the bottom of the glass house and returned into said glass house when necessary.

It is also possible to use this hot air directly, without storing it, for agricultural purposes.

In this way, in the summer, it is not necessary to reheat the air in the glass house during the night. On the contrary, the drying of the cereals or fruit may be improved by using the hot air produced by the collectors C described previously, either at the moment when it is produced, or later, after accumulation of heat in the gravel 36 described previously, be used as well as electro-mechanically or manually opening and closing valves depending on the installer's wishes.

The use of the hot air for drying fruit (plums or grapes for example) and for drying cereals (corn or maize) presents numerous advantages which have often been described by the specialists. This application is cited here only as an example of rational use of hot air which in this case improves the qualities and appearance of an agricultural product, thus increasing its commercial value and contributing to the economy of the system.

EXAMPLE 3

The advantage to the crops in a glass house of increasing the content of carbon dioxide in the surrounding atmosphere has been described many times. This carbon dioxide content is, in fact, for numerous aspects, a variable in the yield of the crop, a low content reducing the yield of the chlorophyllian synthesis whilst a higher proportion allows a better yield of the photosynthesis, translated by an improved yield of the plant production.

This effect being described when all the nutritive constituents remain constant, an addition of carbon dioxide of diverse origin may therefore be associated with the system described in Examples 1 and 2.

The air is then no longer picked up in the glass house but, through a set of pipes and valves, comes from a source where the air contains a proportion of carbon dioxide which is higher than normal. This source may either be the product of the combustion of organic materials or a place of work or rest of humans or animals (individual houses, offices, stables, etc.) where carbon dioxide is naturally exhaled into the air; better still, this source may be provided by a direct connection with bioreactors, for example those of vinification.

In this example, the glass house is advantageously leaning against the southern face of a dwelling or barn, viticultural cellars or a fermentation unit, the air rejected from this building being directly blown into the collector C; according to FIG. 10, the glass house S is leaning against a building 39 sheltering a fermentation vat 40. The carbon dioxide emitted in the vat 40 is introduced into the collector C through pipe 41. According to FIG. 11, the glass house S is leaning against a building comprising a stable 42 surmounted by a barn 43. The air rejected from the stable 42 is blown directly into the collectors C of the glass house and the hot air produced by the collectors C is at least partly blown into the barn 43 in order to dry the grain located therein.

EXAMPLE 4

The two transparent parallel walls 1, 10 which define the volume of the collectors C may be made of glass or a macromolecular material transparent to the whole of the solar flux or, as described hereinabove, the internal face of these walls may be selectively reflecting for wave-lengths higher than 800 nm.

However, in the case of glass houses, the economic and technological constraints are not the same as in public and individual buildings which have been evoked hereinabove, with the result that it is unlikely that glass with selective reflection be used for the construction of a glass house from the technological point of view. The angle of the roof of the glass house varies according to the constructions and the regions but it is necessary to take into account the specific problems of weight and consequently of thickness of the materials used.

Consequently, the upper wall is advantageously constituted by so-called agricultural glass, and the lower wall by a sheet of macro-molecular material transparent to the visible, at least partially opaque to the near infrared and opaque to the distant infrared.

EXAMPLE 5

In the so-called Venetian blind arrangement of the plates used hereinabove, the layer of plates is maintained in a vertical position due to its own weight. It is therefore not necessary to join thereto a system of guiding the plates, in the majority of cases, and these plates may thus be raised or lowered as desired.

In the present case, the inclination of the roof of the glass house requires a device for positioning the network of parallel plates 3. This device may for example be constituted by a chassis in the form of a frame, two sides of which present a rectilinear groove made in their internal face, said groove receiving an adjacent half-pin 3a of each plate 3.

EXAMPLE 6

To remain effective, the collectors C must have the dust which is fixed to the parallel transparent walls 1 and 10 and the network of plates 3 periodically removed therefrom.

To this end, it is possible according to the invention to detach the internal wall 10 made of macro-molecular material to allow access to the internal face of the upper wall 1 as well as to the network of plates 3 and to the internal face of the wall 10 made of macro-molecular material.

To reduce the frequency of this necessary cleaning, the air taken in at the bottom of the glass house is provided to be filtered by a filter of conventional type used in industry.

What is claimed is:

1. In a solar energy collector, of the type comprising:
   a pick-up receiving the solar radiation and converting at least a part of this radiation into heat, and
   heat-exchanger means bringing a heat-exchange fluid into thermal contact with the pick-up and evacuating this fluid towards a user station,
   said pick-up comprising an assembly of juxtaposed plates which are substantially parallel to one another and form a layer,
   the distance between two adjacent plates is chosen so as to constitute a well of heat in which the solar radiation is subjected to at least two reflections,
   at least one of the opposite faces of this well of heat is selectively absorbent for the infrared part of the solar radiation,
   the two faces of this well are substantially reflecting for the rest of the solar spectrum, and
   the layer of plates is disposed between a front transparent wall receiving the solar radiation and a rear wall, these walls being substantially parallel to said layer and defining therebetween an enclosure in which a heat-exchange fluid circulates.

2. The solar energy collector as recited in claim 1, wherein the plates are pivotal about a longitudinal axis.

3. The solar energy collector as recited in claim 1, wherein the other face of each well of heat is reflecting for the solar infrared.

4. The solar energy collector as recited in claim 1, wherein the plates are made of anodised aluminium or glass, metal or plastic with selective absorption of the infrared radiation.

5. The solar energy collector as recited in claim 1, wherein the heat-exchange fluid penetrates into the enclosure through an input opening at the lower end of the space between the layer of plates and the front wall, and the heat-exchange fluid is extracted from the enclosure through an opening in the enclosure at the top end of the space between the layer of plates and the rear wall.

6. The solar energy collector as recited in claim 5, wherein the rear wall is transparent at least for the visible and ultraviolet.

7. The solar energy collector as recited in claim 5, wherein the front wall is provided on its internal face with a layer selectively reflecting the infrared radiation that it receives.

8. The solar energy collector as recited in claim 5, wherein the rear wall is provided on its internal face with a layer selectively reflecting the infrared radiation that it receives.

9. The solar energy collector as recited in claim 5, wherein the front wall is provided with a flap opening at the base and a flap opening at the top of said wall.

10. The solar energy collector as recited in claim 5, wherein the rear wall is provided with a flap opening at the base and a flap opening at the top of said wall.

11. The solar energy collector as recited in claim 1, wherein a second pick-up is disposed downstream of the first pick-up according to the path of the solar radiation.

12. An installation using heat of solar origin applying the solar energy collector as recited in claim 1, said collector constituting one of the outer walls of a glass house, said installation further comprising means for introducting air to be heated at one end of the collector, means for extracting the hot air at the opposite end of said collector and for blowing said hot air into at least one of the following: the glass house itself, an agricultural drier or fermentation, digestion or microbiological reaction chamber.

13. The installation as recited in claim 12, wherein the air to be heated is extracted from the glass house.

14. The installation as recited in claim 12, wherein the air to be heated is extracted from an enclosure containing means for generating carbon dioxide.

15. The installation as recited in claim 12, wherein the hot air passes through a buffer device adapted to store heat, before being introduced into the glass house or the drier.

16. The installation as recited in claim 15, wherein the buffer device comprises a mass of fragments of mineral matter such as river pebbles or gravel.

17. The installation as recited in claim 15, further comprising means for introducing air to be heated into the buffer device, for extracting heated air from said buffer device and for blowing this hot air into at least one of the following: the glass house itself, an agricultural drier or a fermentation, digestion or microbiologial reaction enclosure.

* * * * *